May 15, 1934. F. D. JONES 1,959,239
HAY LOADER
Filed Jan. 16, 1933   3 Sheets-Sheet 1

INVENTORS.
Frank D. Jones
BY Brown, Jackson
Boettcher & Diener
ATTORNEYS.

May 15, 1934.   F. D. JONES   1,959,239
HAY LOADER
Filed Jan. 16, 1933   3 Sheets-Sheet 2
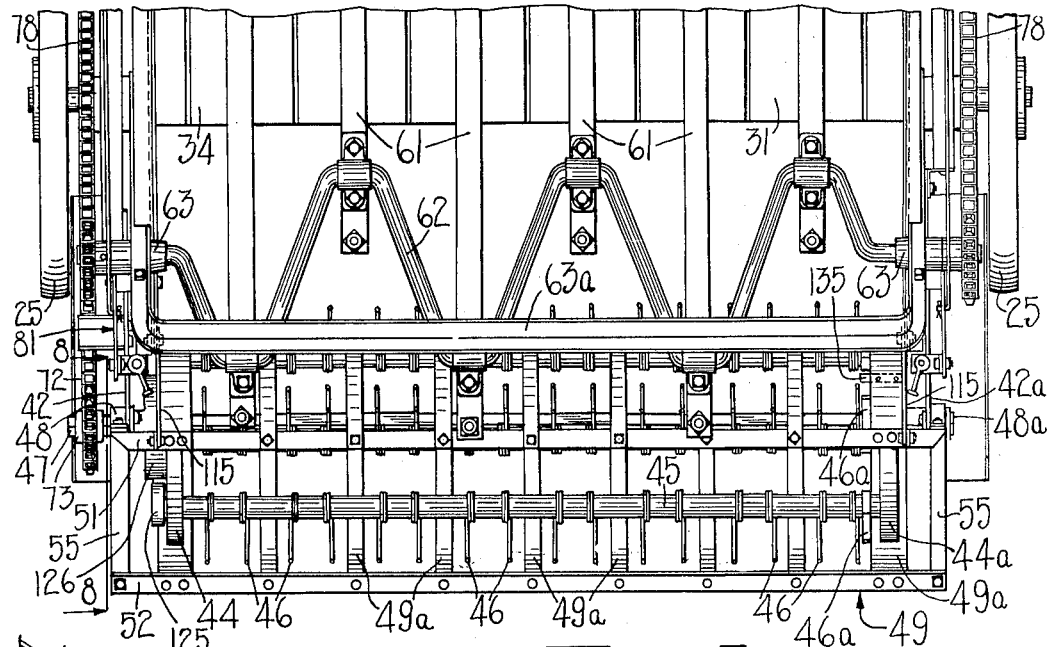
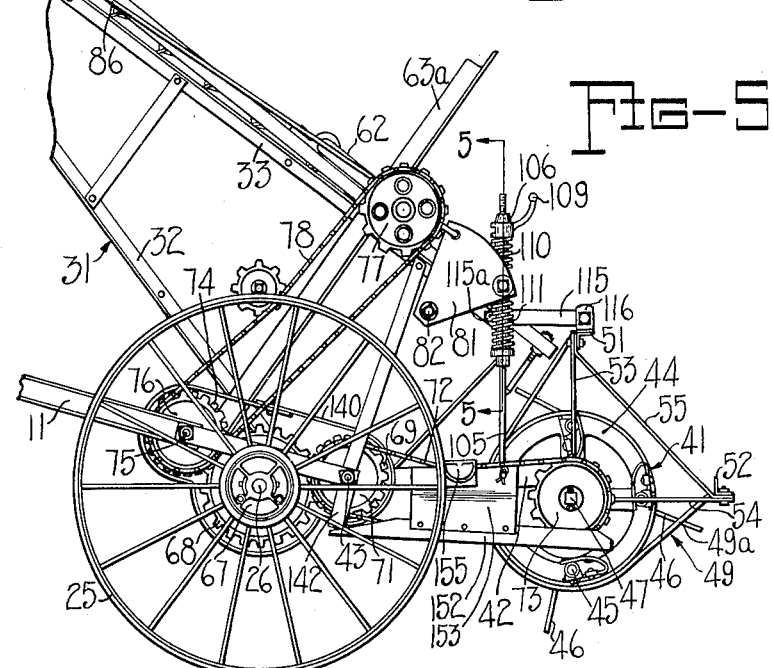
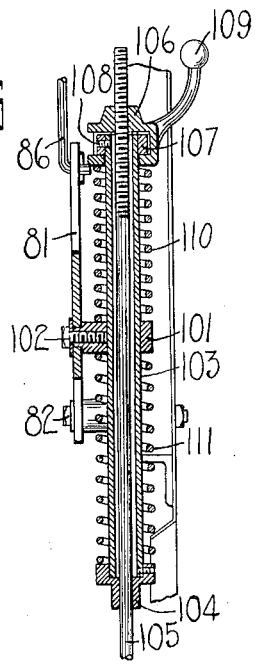

May 15, 1934.  F. D. JONES  1,959,239
HAY LOADER
Filed Jan. 16, 1933  3 Sheets-Sheet 3
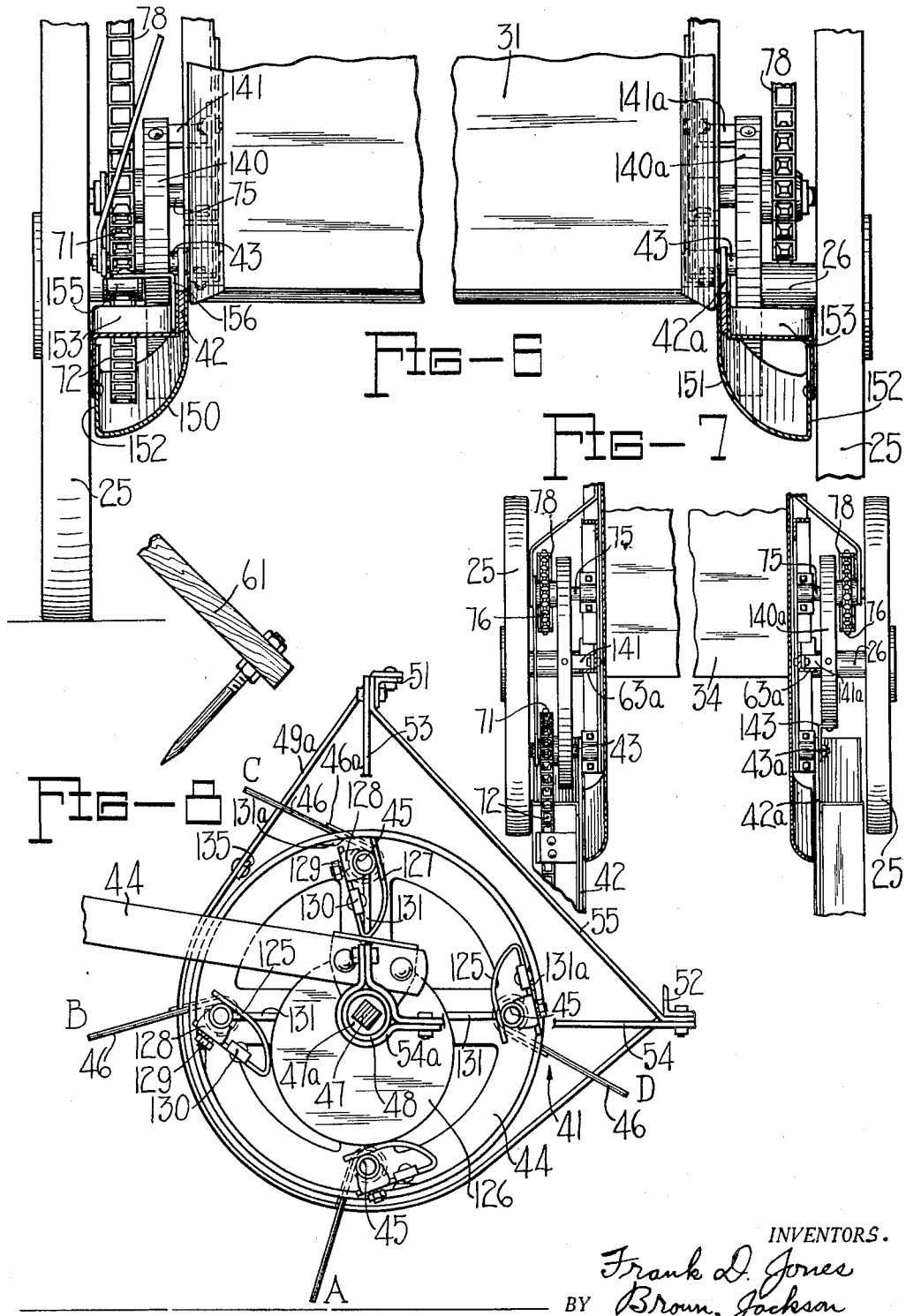
INVENTORS.
Frank D. Jones
BY Brown, Jackson
Boettcher & Dienner
ATTORNEYS.

Patented May 15, 1934

1,959,239

UNITED STATES PATENT OFFICE 1,959,239

HAY LOADER

Frank D. Jones, Ottumwa, Iowa, assignor to Dain Manufacturing Company of Iowa, Ottumwa, Iowa, a corporation of Iowa Application January 16, 1933, Serial No. 651,962

25 Claims. (Cl. 56—363).

My invention relates to hay loaders. One of the features of my invention pertains to that particular type of hay loader wherein a raking cylinder is employed to pick up and deliver the hay to a plurality of reciprocating raker bars, wherein a stripper frame is associated with the raking cylinder which serves to remove or strip the hay from the cylinder, and wherein the raking cylinder is adjustable vertically to accommodate varying quantities of hay or to be raised to an inoperative position. The main object of my invention is to provide a means for holding the stripping frame in close proximity to but yet out of the path of the raker bars in all positions of adjustment of the raking cylinder. By this means the hay is caused to be delivered to the raker bars in the proper manner in all positions of adjustment of the cylinder.

The raking cylinder of the cylinder type of hay loader is usually adjusted relatively close to the ground, and when the hay loader is drawn over rough or uneven ground, the teeth of the raking cylinder are often subjected to shock by contact with hummocks or other foreign objects. Another object of my invention is to provide an improved means for supporting the raking cylinder to permit a yielding displacement of the cylinder in either an upward or downward direction when the teeth of the cylinder contact with foreign objects.

Another object of my invention is to provide an improved means for supporting the raking cylinder to permit a yielding displacement of the cylinder in either an upward or downward direction when the teeth of the cylinder contact with foreign objects, and wherein either end of the cylinder may be adjusted vertically to level the cylinder without affecting the range of yielding displacement in either direction.

Another object of my invention is to provide an improved adjusting mechanism for vertically adjusting the raking cylinder, said mechanism being constructed in such a manner that it may be actuated either from the operator's station on the wagon or from the ground.

Another feature of the invention is the provision of guide members between the ends of the floating cylinder and the deck. The guides have a straight outer face which is positioned close to the inner side of the carrying wheels of the loader, and a curved inner side to guide the hay to the deck. One of the guides also forms the chain housing for the drive chain to the cylinder.

Another feature of the invention is the provision of an improved cam and shoe arrangement for controlling the position of the teeth to properly pick up the hay and deliver it to the raker bars. Stops are provided on the shoes of the tooth bars, which stops contact projections on the cylinder head to hold the cylinder teeth in stripping position with respect to the stripper bars. When the machine is new and stiff, especially when working in light hay, the teeth bars may not readily rock to their proper stripping position. A special stop is also provided on one of the stripper bars which is contacted by a tooth of each bar to insure the teeth bars rocking to their proper stripping position as determined by the stops on the shoes.

Figure 2 is an enlarged fragmentary side view of the lower portion of the hay loader;

Figure 3 is a plan view of Figure 2;

Figure 5 is an enlarged sectional view along the line 5—5 of Figure 2;

Figure 6 is an enlarged sectional view along the line 6—6 of Figure 1;

Figure 7 is an enlarged sectional view along the line 7—7 of Figure 1; and

Figure 8 is an enlarged sectional view along the line 8—8 of Figure 3.

Figures 1, 4:
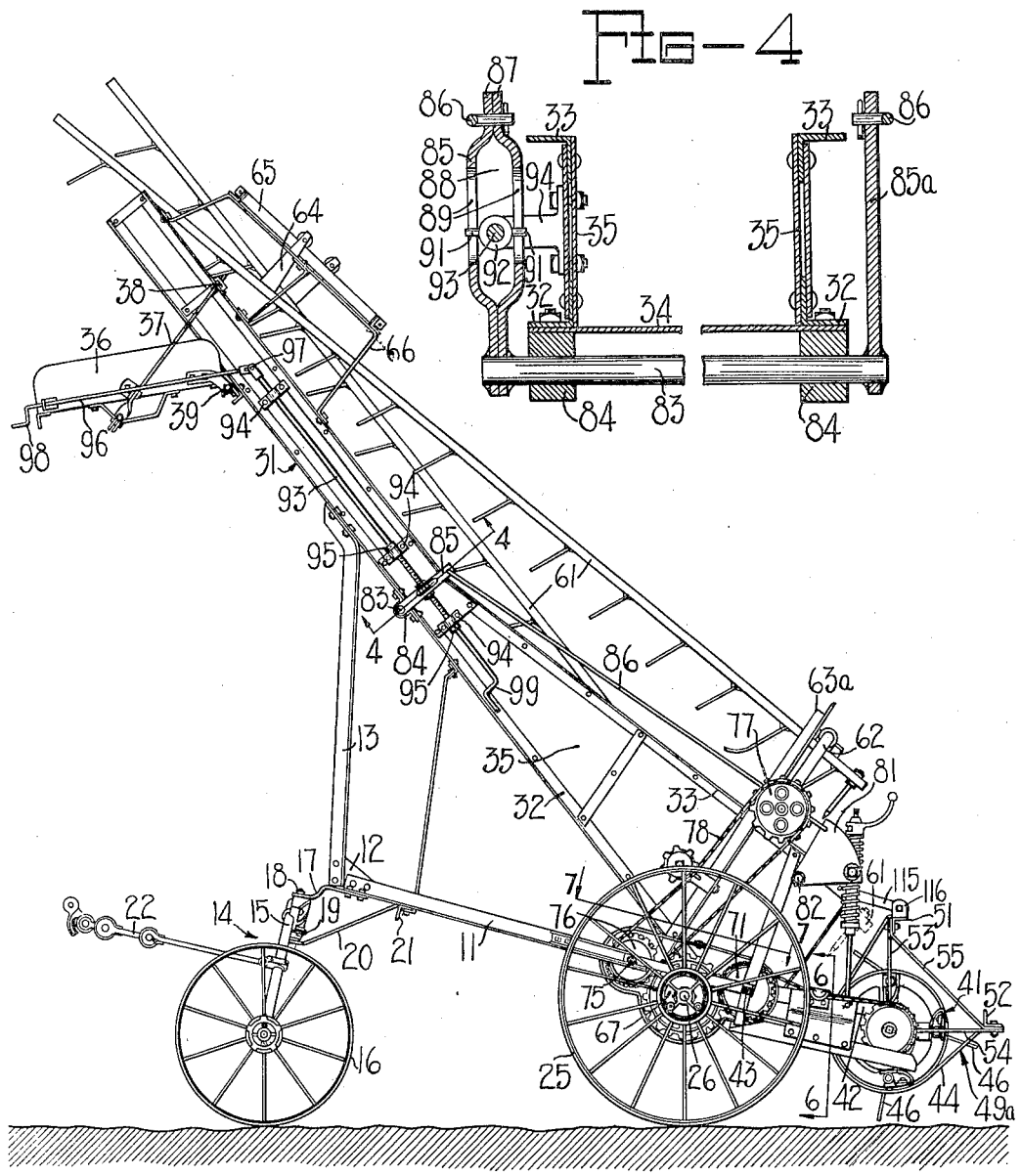
Figure 1 is a side view of a hay loader embodying the novel features of the invention.
Figure 4 is an enlarged sectional view along the line 4—4 of Figure 1.

The hay loader includes a frame comprising a pair of substantially horizontally disposed bars 11, which converge forwardly and are secured at their forward ends to a gusset plate 12, and a pair of vertically disposed bars 13 secured at their lower ends to the gusset plate 12 and diverging laterally therefrom. The front end of the frame is supported on a conventional tongue truck 14 which includes an axle 15 and wheels 16. The frame of the hay loader is connected to the tongue truck 14 by means of a plate 17 which is secured to the forward ends of the bars 11 and extends forwardly therefrom to a pivotal connection with the upper end of a pivot bolt 18 which is inserted in a center casting 19 of the tongue truck and secured to the axle 15 thereof. The tongue truck is braced fore and aft by a brace 20 which extends between the lower part of center casting 19 and a transverse angle 21 which is secured to bars 11. A draw-bar 22 extends forwardly from a connection with axle 15 and is adapted to engage a clevis which is fixed on the rear end of the wagon.

The rear end of the loader frame is supported on wheels 25 which are mounted on the ends of a transverse axle 26. The wheels 25 also serve to drive the mechanism of the hay loader. The axle 26 is journaled in bearings provided adjacent the rear end of frame bars 11.

An inclined elevating deck 31 is supported on the frame bars 11 and 13 and comprises a deck frame having lower angle iron bars 32 and upper angle iron bars 33. A bottom or deck sheet 34 is secured to the horizontal leg of lower angle iron bars 32, and side sheets 35 are secured to the vertical legs of each pair of bars 32 and 33. The bottom sheet 34, which, if desired, may consist of a plurality of sections, terminates at a point below the upper end of the deck frame and an adjustable apron or gate 36 is pivotally mounted on the frame at 39 adjacent the upper end of sheet 34. The adjustable apron 36 is supported in any desired position by means of notched bars or gate latches 37 which are pivoted at each side of the apron and extend upwardly through brackets 38 secured on angle iron bars 33. By the use of the notched supporting bars 37 the delivery end of the gate or apron 36 may be lowered when starting the load and raised as the load builds up, as is customary in this type of implement.

The hay is picked up from the ground by means of a rotating raking cylinder 41 which is positioned adjacent the lower end of deck 31. The raking cylinder 41 is supported on the free ends of a floating frame consisting of a pair of cylinder supporting arms 42 and 42a which extend rearwardly from bolts 43 and 43a provided on opposite sides of deck 31 adjacent the lower end thereof. The raking cylinder 41 includes the usual drum heads 44 and 44a disposed at opposite ends thereof and in which are journaled a plurality of pipe members 45 upon which are secured resilient fingers 46 which engage the hay and lift it from the ground. The heads 44 and 44a are fixed to an axle 47 of square cross section, and each head has an outwardly extending hub 47a and 47b journaled in bearings 48 and 48a secured on the free ends of supporting arms 42 and 42a, respectively.

The hay is stripped off the fingers 46, at the desired elevation, by means of a stripping frame 49 comprising bars 49a which are disposed along cylinder 41 and extend within the periphery of the fingers. The stripper bars 49a are U-shaped and are supported on transversely disposed upper and lower angle iron bars 51 and 52. The upper angle iron bar 51 is supported on arms 53, and the lower angle iron bar 52 is disposed at the rear of raking cylinder 41 and is supported on rearwardly extending arms 54. The arms 53 and 54 terminate in circularly bent portions 54a which are journaled over the bearings 48 and 48a. A diagonal brace 55 extends between each pair of arms 53 and 54.

The angular position which the teeth 46 assume during rotation of the cylinder 41 is controlled by means of a shoe 125 fixed on the end of each pipe 45 outside of drum head 44. These shoes engage a cam 126 during a portion of their circuit to hold the teeth in proper raking position. The shoes 125 comprise generally U-shaped members 127 which are fixed to pipe 45 by means of a casting 128 and bolt 129. The cam 126 is formed integral with the bearing 48 and is of circular formation positioned eccentrically with respect to the bearing 48.

During the raking operation, the raking drum rotates in a clockwise direction as viewed in Figure 8, the shoes 125 riding along the lower portion of the cam 126 as shown in positions A and B in Figure 8. Shortly after moving beyond position B, the shoes 125 leave the cam 126 and permit the tooth bar to rock forwardly. This forward rocking movement is limited by a stop 130 fixed to the member 127 of the shoe. The stops 130 have inward projections which are adapted to contact with ribs 131 extending outwardly from and formed integral with the drum heads 44. When the stops 130 are in engagement with the ribs 131, as shown at C, the teeth 46 are positioned at substantially right angles to the upper portion of the stripper bars 49a as a result of which they are withdrawn from the hay with no tendency to pull hay in between the stripper bars, at the same time tending to hold the hay up against the bars and into the path of the raker bars 61.

As the fingers 46 move around beyond the position C and beyond a vertical position, the weight of the fingers cause them to rock in a clockwise direction, looking at Figure 8, until stops 130 strike small lug 131a provided on the rim of the drum head 44 as shown at D. The fingers remain in this position with respect to the drum until they come in contact with the hay, whereupon they will rock in a counter-clockwise direction until the shoe strikes the surface of cam 126.

When the machine is new, and especially when working in light hay, the weight of the hay is not always sufficient to rock the teeth down to the position where the stops 130 contact with the rib 131 as shown at C, and to insure the teeth always taking this position a lug 135 is provided. The lug 135 is fixed to the end stripper bar 49a (see Figure 3) on the right side and extends inwardly therefrom into the path of a short end tooth 46a fixed to the pipe 45 adjacent the inner side of the drum head 44a. The lug 135 is positioned so that the teeth 46 may pass underneath it only after the tooth carrying pipe 45 has been rocked to the position determined by the stop 130 bearing against the rib 131.

When the hay has been stripped off the raking cylinder 41 it is engaged by a plurality of reciprocating raker bars 61 supported above the deck. The lower ends of raker bars 61 are supported by bearings on a crank shaft 62 which is mounted in bearing brackets 63. The bearing brackets 63 are secured to an arch member 63a which extends over the deck 31. The arms of the arch member extend down along each side and are connected, as by bolts, to the angle members 33 and 32. A loop or forked bracket 64 is secured to each raker bar 61, adjacent the upper end thereof, and each bracket extends upwardly and embraces a longitudinally disposed rail 65. The rails 65, one of which is provided for each forked bracket 64, are supported in a frame 66 which extends transversely of the elevating deck 31 and is secured to the upper angle iron bars 33 adjacent the upper ends thereof.

The raker bars 61 and cylinder 41 are operated simultaneously with the forward advance of the hay loader by power supplied from the supporting wheels 25. A ratchet clutch mechanism 67 is provided between each wheel 25 and the axle 26 by means of which the axle 26 is rotated by power derived from either or both wheels. A spur gear 68 is secured to axle 26 adjacent each end thereof and is disposed between deck 31 and wheel 25. A gear 69 is journaled on bolt 43 and meshes with the adjacent one of the gears 68. A sprocket 71 is secured to gear 69 and is rotatable therewith. A sprocket 73 is secured on axle 47 of cylinder 41 and aligns with sprocket 71. A sprocket chain 72 connects sprockets 71 and 73 and provides a driving connection for cylinder 41. A spur gear 74 meshes with each gear 68 and is journaled on spindles 75 which are secured to the loader frame. A sprocket 76 is secured to each gear 74 and a sprocket 77 is secured on each end of crank shaft 62 and is positioned so as to align with the associated sprocket 76. A chain 78 is trained over each pair of sprockets 76 and 77 and provides a driving connection for the crankshaft 62. Gears 68, 69 and 74 on the left side of the machine are guarded by means of a shield 140 supported from the frame by means of a bracket 141 (see Figures 6 and 7) fixed to the lower end of arch 63a and by means of a bracket 142 depending from pivot bolt 43. The gears 68 and 74 on the right hand side of the machine are guarded by means of a shield 140a supported from the frame by means of a bracket 141a secured to the arch 63a and by means of bracket 143 fixed to pivot bolt 43.

To aid in conducting the hay onto the deck 31, a pair of upwardly and forwardly curved guides 150 and 151 are provided. These guides extend from adjacent the lower end of the deck rearwardly beyond the periphery of cylinder 41. They are supported along the upper edge from supporting arms 42 and 42a. Along their lower outer edge, they are provided with upturned flanges 152 which are disposed in close proximity to wheels 25. These guides are further supported by means of Z-shaped members 153 which are riveted at one end to the upturned flanges 152 and at the other end to the arms 42 and 42a. These guides, due to their shape, guide the hay up onto the platform and prevent it from crowding up between the side walls of the deck and the inner side of the supporting wheels 25. The guide 150 on the left side of the machine also forms a guard for chain 72. A guide 155 (see Figure 2) for the chain 72 is also supported from the bracket 156 fixed to the arm 42.

The raking cylinder 41 is normally adjusted to a position relatively close to the ground, but when the hay is extremely heavy it is necessary to adjust the cylinder higher. When transporting the hay loader from one field to another the raking cylinder is raised a considerable distance from the ground so that the cylinder teeth will not become damaged or broken through contact with hummocks or other foreign objects. The hay loader frequently encounters obstacles in the field and to prevent damage to the cylinder teeth the raking cylinder is yieldingly supported against both upward or downward displacement.

The raking cylinder 41 is yieldingly supported in any desired operating position or in an inoperative position by means of a supporting mechanism which is provided at each side of deck 31. An arm in the form of a bell crank 81 is pivoted at 82 adjacent the lower end of each side sheet 35. A transverse rock shaft 83 (see Figures 1 and 4) is positioned below deck 31, intermediate its ends, and is journaled in bearing brackets 84 which are secured to the under side of the lower angle iron bars 32. The arms 85 and 85a are secured on opposite ends of the rock shaft 83 and each arm aligns with one of the bell cranks 81. An adjusting link 86 engages one side of each bell crank 81 and extends forwardly and is connected to the aligning arm. The arm 85 is formed of a pair of bars 87 which are secured together at their ends and are offset laterally in opposite directions between their ends to form a yoke 88.

A longitudinal slot 89 is provided in the offset portion of each bar 87 and these slots serve as guideways for trunnions 91 which extend laterally from a threaded adjusting nut 92. The adjusting nut 92 is positioned within the hole 88 and engages a threaded portion of an adjusting rod 93 which is supported in bearing brackets 94 secured to a side sheet 35 of deck 31. The rod 93 is held against endwise displacement by collars 95 (see Figure 1) which bar against certain of the brackets 94. The upper end of rod 93 terminates adjacent the pivot 39 and is connected to a crank rod 96 which is supported on apron 36, by means of a universal joint 97. A crank handle 98, formed on the forward end of crank rod 96, provides a means by which the rod may be rotated from the operator's station on the wagon. A crank handle 99 is formed on the lower end of adjusting rod 93 and is within reach of the operator when standing on the ground. By rotating either the crank handle 98 or 99, adjusting nut 92 will be caused to travel along the threaded portion of rod 93. As nut 92 travels along rod 93, the arms 85 and 85a are rocked in the corresponding direction and through the links 86 the bell cranks 81 are also rocked.

A resilient connection is provided between the opposite side of each bell crank 81 and the respective arm 42. A block 101, shown in Figure 5, is pivotally attached to the inner side of each bell crank 81 by pivot bolt 102. An opening is provided in each block 101 and a sleeve or tube 103 is slidingly supported therein. A collar 104 is secured on the lower end of each sleeve 103. A cylinder supporting rod 105 is pivotally attached to each arm 42 and extends upwardly through the collar 104 and the sleeve 103. The upper end of rod 105 is threaded and is engaged by the threaded portion of an adjusting nut 106. A bifurcated portion is formed on the lower side of nut 106 and is adapted to receive a collar 107. The collar 107 is secured to sleeve 103 by means of a set screw 108. Slight adjustments, such as are necessary to level the raking cylinder 41, are made by turning the adjusting nut 106 and to facilitate this turning a handle 109 is provided thereon. A spring 110 is provided on the upper end of sleeve 103 and is confined between block 101 and adjusting nut 106. A similar spring 111 is mounted on the lower end of sleeve 103 and is confined between block 101 and collar 104. This resilient connection is provided at each side of the implement. The upper springs 110 provide a resilient support against downward thrusts on raking cylinder 41 and springs 111 yieldingly resist upward thrusts thereof. This yielding action of raking cylinder 41 prevents teeth 46 from becoming broken or damaged when the hay loader is used on uneven ground. As previously described, springs 110 and 111 are mounted outside of sleeve 103 and supporting rod 105 extends through the sleeve. By reason of this construction, supporting rod 105 may be adjusted to raise or lower the adjacent end of raking cylinder 41 without affecting the tension of springs 110 and 111.

The stripping frame 49 is positioned relatively close to the path of reciprocating raker bars 61 in all operating positions of cylinder 41, so that the hay will be engaged by the raker bars immediately after it has been stripped from the cylinder and at all positions of the cylinder as it follows the contour of the ground. The raking cylinder 41 is adjusted from one operating position to another or to an inoperative position by swinging supporting arms 42 upwardly about their pivots 43, the cylinder moving in an arc concentric with the pivots 43 of arms 42.

To maintain the stripping frame in proper stripping position and also to prevent its coming in contact with the raker bars when cylinder 41 is adjusted vertically or is raised from an operating to an inoperative position, I have provided a stabilizing means by which the stripping frame is caused to move substantially parallel to itself. The stabilizing means comprises a spacing bar or link 115 mounted at each side of the hay loader and disposed substantially in parallelism with the arms or links 42 and 42a. One end of each bar 115 is pivotally connected, as at 115a (Figure 2), to the rear end of the adjacent upper angle iron bar 33 of the elevating deck 31 and the opposite end is pivotally connected to a bracket 116 which is secured at each end of angle iron bar 51 of the stripping frame. Bar 115 is of the proper length to hold the stripper bars 49a out of the path of raker bars 61 in all positions of the raking cylinder including its transport position, and at the same time hold them in proper stripping position in close proximity to the raker bars.

Figure 2 illustrates the position of the stripper frame relative to the raker bars when the cylinder is raised to substantially its maximum position. Other positions are indicated in Figures 1 and 8. From these figures it will be noted that the pivot points 115a are substantially in the plane occupied by the raker bars when in their lowest position, as shown in Figure 2. By virtue of this construction, the stripper frame 49 is never closer to the raker bars than is indicated in Figure 2, in which the raker cylinder is shown in its completely raised position. During the vertical movement of the cylinder to and from the position shown in Figure 2 the portions of the stripper bars 49a adjacent the lower ends of the raker bars move vertically in substantially parallel planes adjacent the lower ends of the raker bars. Although this particular movement is not essential, it is desirable since the pick-up cylinder is always maintained closely adjacent the lower ends of the raker bars.

While I have described above one illustrative construction in which the principles of the present invention are preferably embodied, it is to be understood that my invention is not to be limited to the means described above, but that, in fact, widely different means may be employed in the broader aspects of my invention.

What I claim, therefore, and desire to secure by Letters Patent is:

1. A hay loader comprising an inclined elevator frame, hay elevating means cooperating therewith, separate raking means arranged adjacent the lower end of said frame, stripper means associated with said raking means for stripping hay from the latter, means for supporting said raking means for vertical movement relative to said elevator frame, and means for retaining said stripping means in proper position relative to said elevating means during the vertical movements of said raking means.

2. A hay loader comprising an inclined elevator frame, hay elevating means including raker bars cooperating with said frame, separate raking means arranged adjacent the lower ends of said bars, and link means connecting said separate raking means with the lower end of said frame and providing for substantially parallel movement of said raking means with respect to the lower ends of said raker bars.

3. A hay loader comprising an inclined elevator frame, hay elevating means including raker bars cooperating with said frame, separate raking means arranged adjacent the lower ends of said bars, and link means connecting said separate raking means with the lower end of said frame, said link means including upper links pivoted to said elevator frame at points adjacent the lowermost position of said raker bars and lower links longer than said upper links.

4. A hay loader comprising an inclined elevator frame, hay elevating means inclinding raker bars cooperating with said frame, separate raking means arranged adjacent the lower ends of said bars, link means connecting said separate raking means with the lower end of said frame, said link means including two pair of links connected at their rear ends with upper and lower portions of the separate raking means and connected at their forward ends with upper and lower portions of said inclined elevator frame, and means connected with certain of said links for raising and lowering said separate raking means.

5. A hay loader comprising an inclined elevator frame, hay elevating means including raker bars cooperating with said frame, a floating raking cylinder disposed adjacent the lower end of said frame and adapted to direct hay toward the lower ends of said raker bars, a stripper frame journaled for movement about the axis of said cylinder, and a pair of links connecting the upper portion of the stripper frame with said inclined elevator frame to control the movements of the stripper frame during the floating movements of said raking cylinder.

6. A hay loader comprising an inclined elevator frame, hay elevating means cooperating therewith, separate raking means arranged adjacent the lower end of said frame, and means disposed adjacent opposite sides of the frame for guiding hay from said separate raking means toward said hay elevating means.

7. A hay loader comprising an inclined elevator frame, hay elevating means including raker bars cooperating with said frame, separate raking means arranged adjacent the lower ends of said bars, and guards disposed on opposite sides of said frame adjacent the lower end thereof for directing hay from said separate raking means toward the lower ends of said raker bars.

8. A hay loader comprising an inclined elevator frame, hay elevating means cooperating therewith, separate raking means arranged adjacent the lower end of said frame and movable vertically with respect thereto, and guide members disposed on opposite sides of said separate raking means and movable vertically therewith, said guide members serving to direct the hay from said separate raking means toward the hay elevating means on said inclined elevator frame.

9. A hay loader comprising an inclined elevator frame, hay elevating means cooperating with said frame, a toothed raking cylinder disposed adjacent the rear end of said frame, arms pivotally connected with said frame and raking cylinder and serving to connect the latter therewith for relative vertical movement, and a guide member carried by each of said arms and movable therewith, said guide members being disposed adjacent the sides of the inclined elevator frame and serving to direct hay from the raking cylinder toward the hay elevating means on said frame.

10. A hay loader comprising an inclined elevator frame, hay elevating means cooperating therewith, a rotatable raker cylinder disposed adjacent the rear end of said frame and operative to deliver hay to said hay elevating means on the frame, rearwardly extending arms pivoted to said frame and connected with said cylinder to provide for floating movement of the latter in a substantially vertical direction, said arms being disposed at opposite sides of said frame, guide members carried by each of said arms adjacent the ends of said cylinder and curved in an upwardly converging relation to guide the hay toward said hay elevating means, and driving means for said cylinder disposed alongside one of said guide members.

11. A hay loader comprising an inclined elevator frame, hay elevating means cooperating therewith, carrying wheels for said frame, rotary raking means disposed adjacent the rear end of said frame and comprising a raker cylinder, arms pivotally connecting said cylinder with said frame for floating movement with respect thereto, said arms being disposed at opposite sides of said frame and closely spaced with respect to the ends of said cylinder and the sides of said frame, curved guide members carried by said arms and serving to guide the hay onto the inclined elevator frame, driving means extending from one of said carrying wheels alongside one of said guide members to one end of said cylinder to drive the latter, and means connecting the laterally inner and outer portions of each of said guide members with the associated supporting arm.

12. In a hay loader, a rotary raking cylinder comprising a plurality of transversely disposed tooth carrying bars, cylinder heads in which said bars are journaled for rocking movement, shoe means connected to one end of each of said tooth bars, a relatively stationary cam member cooperating with said shoes to position the teeth in proper raking position when the cylinder including said cylinder heads is rotated, and positively acting means serving to rock each of said tooth bars to a stripping position.

13. In a hay loader, a rotary raking cylinder comprising a pair of drum heads, a plurality of tooth carrying bars journaled for rocking movement in said heads, a central shaft upon which said heads are journaled for rotation, substantially stationary bearing means supporting said heads and said shaft, a stationary cam member disposed adjacent one of said heads and eccentrically disposed with respect to the axis of said shaft, a shoe member carried at one end of each of said tooth carrying bars, said shoes cooperating with said cam member to rock said tooth carrying bars to raking position and arranged to move out of contact with the cam member to permit of the withdrawal of the teeth from the hay, and stop means on the shoes and the adjacent head and serving to limit the rocking movement of the tooth carrying bars.

14. In a hay loader, a rotary raking cylinder comprising a pair of laterally spaced cylinder heads, a plurality of transversely disposed tooth carrying bars journaled for rocking movement in said heads, a supporting shaft on which said heads are journaled for rotation, relatively stationary cam means carried by said shaft adjacent one end of the raking cylinder, shoes secured to one end of the tooth carrying bars and cooperating with said cam member for controlling the position of said bars during the raking operation, said cam member being formed to provide for each of the shoes moving out of contact therewith as each tooth carrying bar approaches its hay stripping position, means for positively rocking each bar to its stripping position, stop means limiting the rocking of each bar toward said position, and additional stop means serving to limit the rocking movement of each bar toward raking position.

15. In a hay loader, a rotary raking cylinder comprising a pair of cylinder heads and a plurality of transversely disposed tooth carrying rake bars journaled in said heads for rocking movement toward and away from hay raking position, cam means disposed adjacent one end of the cylinder, a shoe member carried at one end of each of said bars and cooperating with said cam member to hold each of said rake bars in raking position, a plurality of stripper bars encircling said raking cylinder and serving to strip the hay from said tooth bars, separate means for postively rocking each of said tooth bars to a position wherein the teeth thereof are retracted at substantially right angles with respect to the stripper bars to free the hay from the tooth bars, a stop member carried by each of said shoe members, and a pair of spaced stops on one of said cylinder heads and adjacent each of said shoe members, said spaced stops cooperating with the stop member on the associated shoe to limit the rocking movement of each tooth bar toward stripping position and toward raking position.

16. A hay loader comprising an inclined elevator frame, hay elevating means including raker bars cooperating with said frame, separate raking means arranged adjacent the lower end of said bars, and self-locking mechanism operable from a plurality of said positions on said loader for raising and lowering said separate raking means relative to said elevator frame.

17. A hay loader comprising an inclined elevator frame, hay elevating means including raker bars cooperating with said frame, separate raking means arranged adjacent the lower end of said bars, and adjustable means including an operating member extending alongside said frame and a pair of spaced handle means operable, respectively, from the front and from the side of the frame for raising and lowering said separate raking means relative to said elevator frame.

18. A hay loader comprising an inclined elevator frame, hay elevating means including raker bars cooperating with said frame, separate raking means arranged adjacent the lower end of said bars, link means connecting the upper and lower portion of said raking means with opposite sides of said frame for relative vertical movement, means including a pair of arms rockably mounted on said frame, means including opposed springs connecting each end of the raking cylinder with the associated arm for supporting the cylinder for yielding displacement in either an upward or downward direction, and means for rocking said arms to adjust the vertical position of the cylinder relative to said frame.

19. A hay loader comprising an inclined elevator frame, hay elevating means cooperating with said frame, separate raking means arranged adjacent the lower portion of said hay elevating means, and link means connecting said separate raking means with the lower end of said frame and providing for substantially parallel movement of said raking means with respect to the lower end of said hay elevating means.

20. A hay loader comprising an inclined elevator frame, hay elevating means including raker bars cooperating with said frame, separate raking means arranged adjacent the lower ends of said bars and including movable rake teeth and a stripper frame associated therewith, link means connecting said separate raking means with the lower end of said frame, said link means including two pair of links connected at their rear ends with upper and lower portions of the stripper frame and connected at their forward ends with upper and lower portions of said inclined elevator frame, and means connected with certain of said links for raising and lowering said separate raking means.

21. A hay loader comprising an inclined elevator frame, hay elevating means including raker bars cooperating with said frame, a floating raking cylinder disposed adjacent the lower end of said frame and adapted to direct hay toward the lower ends of said raker bars, a stripper frame journaled for movement about the axis of said cylinder and including interconnected transverse bars disposed above and rearwardly of said cylinder and curved stripping bars embracing said raking cylinder and secured to said transverse bars, and link means connecting one of said transverse bars with said inclined elevator frame to control the movements of the stripper frame with respect to the lower ends of said raker bars during the floating movements of said raking cylinder.

22. A hay loader comprising an inclined elevator frame, hay elevating means cooperating therewith, a rotatable raker cylinder disposed adjacent the rear end of said frame and operative to deliver hay to said hay elevating means on the frame, rearwardly extending arms pivoted to said frame and connected with said cylinder to provide for floating movement of the latter in a substantially vertical direction, said arms being disposed at opposite sides of said frame, guide members carried by each of said arms adjacent the ends of said cylinder and disposed in an upwardly converging relation to guide the hay toward said hay elevating means, means including a sprocket chain for driving said cylinder, and guard means for the lower run of said chain carried by and cooperating with one of the guide members.

23. In a hay loader, a rotary raking cylinder comprising a plurality of transversely disposed tooth carrying bars, cylinder heads in which said bars are journaled for rocking movement, means adapted to position the teeth in proper raking position when the cylinder including said cylinder heads is rotated, and positively acting means serving to rock each of said tooth bars to a stripping position.

24. In a hay loader, a rotary raking cylinder comprising a plurality of transversely disposed tooth carrying bars, cylinder heads in which said bars are journaled for rocking movement, a stripper frame embracing said cylinder, and positively acting means carried by said frame for rocking each of said tooth bars to a stripping position.

25. In a hay loader, a rotary raking cylinder comprising a plurality of transversely disposed tooth carrying bars, cylinder heads in which said bars are journaled for rocking movement, a stripper frame including portions embracing said cylinder and portions disposed tangentially with respect to the periphery thereof, and positively acting means carried by said frame for rocking each of said tooth bars to a position such that the rake teeth carried thereby are disposed substantially perpendicular with respect to the tangential portions of said stripper frame.

FRANK D. JONES.

CERTIFICATE OF CORRECTION.

Patent No. 1,959,239.  May 15, 1934.

FRANK D. JONES.

It is hereby certified that error appears in the printed specification of the above numbered patent requiring correction as follows: Page 3, line 85, for "bar" read bear; page 5, line 111, claim 16, strike out the word "said" first occurrence; and that the said Letters Patent should be read with these corrections therein that the same may conform to the record of the case in the Patent Office.

Signed and sealed this 19th day of June, A. D. 1934.

Bryan M. Battey (Seal) Acting Commissioner of Patents.